(12) United States Patent
Sandoval

(10) Patent No.: US 6,990,073 B1
(45) Date of Patent: Jan. 24, 2006

(54) DATA PACKET CONGESTION MANAGEMENT TECHNIQUE

(75) Inventor: Jesse Sandoval, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 802 days.

(21) Appl. No.: 09/820,477

(22) Filed: Mar. 28, 2001

(51) Int. Cl.
H04L 1/00 (2006.01)

(52) U.S. Cl. .................................... 370/232
(58) Field of Classification Search ......... 370/229–236
See application file for complete search history.

(56) References Cited

U.S. PATENT DOCUMENTS

| | | | | |
|---|---|---|---|---|
| 5,359,592 A | * | 10/1994 | Corbalis et al. | 370/233 |
| 5,719,853 A | * | 2/1998 | Ikeda | 370/229 |
| 6,252,848 B1 | * | 6/2001 | Skirmont | 370/229 |
| 6,333,917 B1 | * | 12/2001 | Lyon et al. | 370/236 |
| 6,515,963 B1 | * | 2/2003 | Bechtolsheim et al. | 370/229 |
| 6,556,578 B1 | * | 4/2003 | Silberschatz et al. | 370/412 |
| 6,765,871 B1 | * | 7/2004 | Knobel et al. | 370/231 |
| 6,839,321 B1 | * | 1/2005 | Chiruvolu | 370/230.1 |

* cited by examiner

Primary Examiner—John Pezzlo
Assistant Examiner—Dmitry Levitan
(74) Attorney, Agent, or Firm—Christopher P. Maiorana, P.C.

(57) ABSTRACT

A circuit for use in a data packet transmission system. The circuit generally comprises a buffer and a test circuit. The buffer may be configured to store a plurality of data packets. The test circuit may be configured to (i) monitor a number of the plurality of data packets in the buffer, (ii) permit an additional data packet to the plurality of data packets into the buffer responsive to the number being less than a first threshold, and (iii) discard the additional data packet in accordance with a probabilistic test responsive to the number being greater than the first threshold.

20 Claims, 3 Drawing Sheets

DATA PACKET CONGESTION MANAGEMENT TECHNIQUE

FIELD OF THE INVENTION

The present invention relates to a method and/or architecture for transporting data packets generally and, more particularly, to a method and/or architecture for managing congestion while moving data packets through a resource buffer.

BACKGROUND OF THE INVENTION

Conventional transfer control protocol (TCP) buffering management techniques do not detect congestion until after the congestion has occurred. The conventional TCP buffering techniques allow data packets to be discarded automatically (i.e., first-in-first-out buffer overflows) with no indication or signal presented to the sender to slow down or to resend discarded data packets. Hence, data packet congestion avoidance is not performed.

To keep the client/server nature of the conventional TCP as functional as possible, flow control is implemented. Features of the conventional TCP flow control include slow start, fast retransmit, and fast recovery. With the slow start feature, the conventional TCP is allowed to send new data packets to the network at the same rate at which it receives acknowledgments from the other end of the connection.

To accommodate the slow start, a window called a congestion window is added to the conventional TCP of a sender. Given an exponentially increasing nature of the congestion window, problems are bound to occur. Eventually the size of the congestion window will become large, congestion will occur, and segments carrying the data packets can be lost or dropped by intermediate devices, such as routers.

The fast retransmit process is used by the conventional TCP when a segment is believed to be lost in transmission. The conventional TCP specifies that all segments must be acknowledged. Thus, duplicate acknowledgments are sent when a segment is received out of order or possibly lost. A disadvantage of the conventional TCP is that there is no way of knowing whether the segment was lost in transmission or just received on the other end out of order.

The fast recovery process is used after the fast retransmit is implemented. The conventional TCP recalculates the congestion window size and performs a slow start operation. One particular problem with the fast recovery process is that any ongoing conventional TCP connection between two computers will still have data moving across the connection. If the computers need to stop what they are doing in order to reinstitute a slow start operation, eventually a severe performance degradation within the connection will occur.

SUMMARY OF THE INVENTION

The present invention concerns a circuit for use in a data packet transmission system. The circuit generally comprises a buffer and a test circuit. The buffer may be configured to store a plurality of data packets. The test circuit may be configured to (i) monitor a number of the plurality of data packets in the buffer, (ii) permit an additional data packet to the plurality of data packets into the buffer responsive to the number being less than a first threshold, and (iii) discard the additional data packet in accordance with a probabilistic test responsive to the number being greater than the first threshold.

The objects, features and advantages of the present invention include providing a method and/or architecture for implementing a data packet congestion management technique that may (i) allow a transfer control protocol flow to reduce a data packet transmission rate upon congestion detection at a resource buffer, (ii) discard low precedence data packets, (iii) avoid filling the resource buffer and accidentally dropping data packets without a recovery mechanism, (iv) implement congestion detection, (v) implement flow rate control, and/or (vi) implement data packet recovery.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
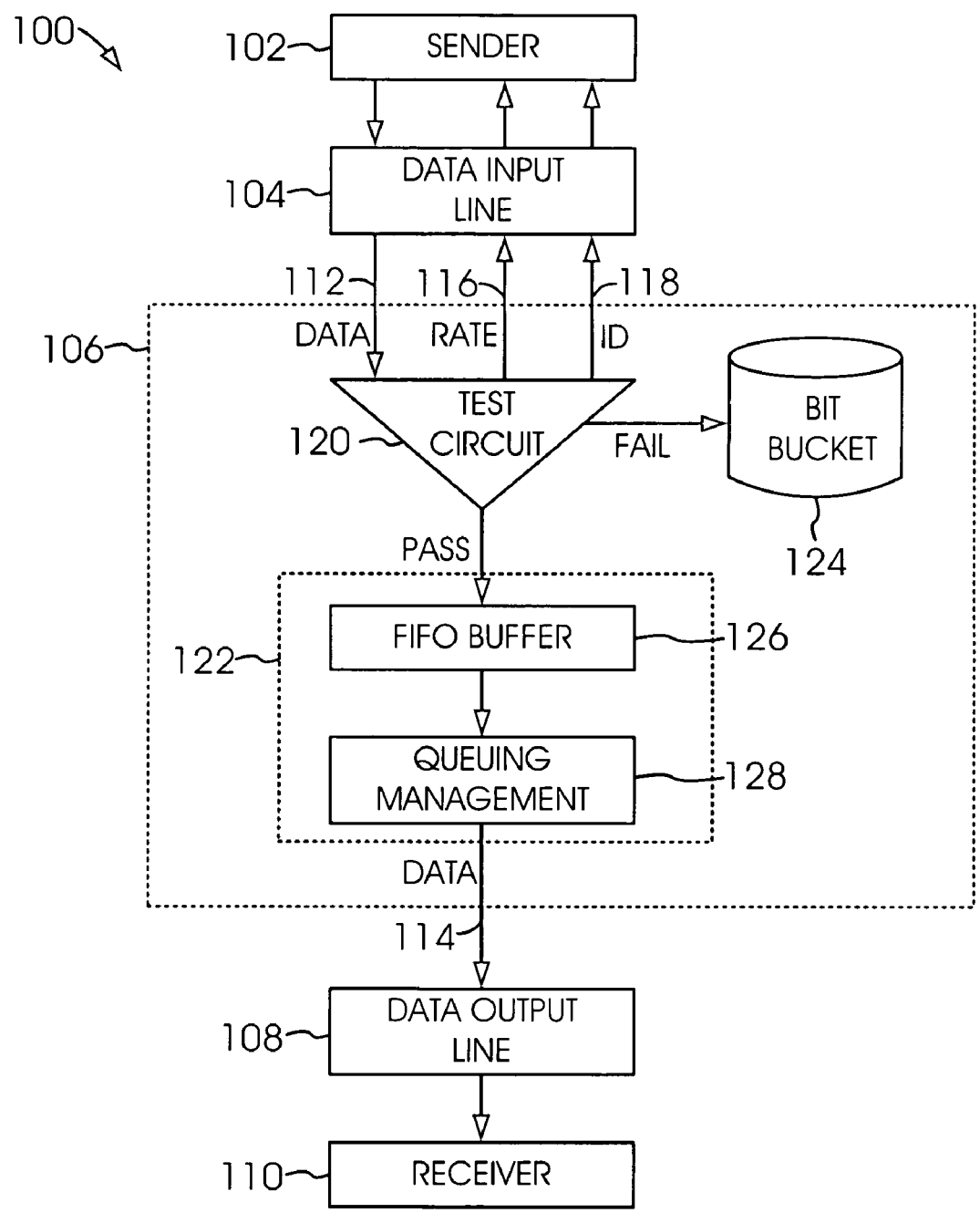
FIG. 1 is a block diagram of a system incorporating a preferred embodiment of the present invention.

Referring to FIG. 1, a block diagram of a system 100 is shown in accordance with a preferred embodiment of the present invention. The system 100 may provide an improved transmission control protocol (TCP) flow by using a data packet congestion management technique. The data packet congestion management technique may detect symptoms of congestion prior to the data packets reaching a first-in-first-out (FIFO) buffer resource.

The data packet congestion management technique may begin to discard data packets according to a probabilistically predetermined method. A signal may be simultaneously presented to a sender of the data packets through an appropriate improved TCP flow to indicate that the sender should slow a transmission rate of the data packets. Another signal may also indicate which discarded data packets should be resent. Once the FIFO buffer resource is generally in a stable state, then the sender may be informed to increase the transmission rate to an allocated bandwidth.

The system 100 generally comprises a sender 102, a data input line 104, a circuit 106, a data output line 108, and a receiver 110. The sender 102 may provide a signal (e.g., DATA) along the data input line 104 to an input 112 of the circuit 106. The signal DATA may serve to carry the data packets. The circuit 106 may have an output 114 through which the signal DATA may be presented to data output line 108 and ultimately the receiver 110. An output 116 may be provided at the circuit 106 for presenting a signal (e.g., RATE) to the receiver 102 through the data input line 104. Another output 118 may be provided at the circuit 106 for presenting another signal (e.g., ID) to the receiver 102 through the data input line 104.

In a preferred embodiment of the present invention, the circuit 106 generally comprises a test circuit 120, a FIFO scheduling and queuing block 122, and a bit bucket 124. The test circuit 120 may be in communication with the input 112 of the circuit 106 to receive the signal DATA. The test circuit 120 may present the signal RATE and the signal ID to the output 116 and the output 118 respectively of the circuit 106. The test circuit 120 may present the signal DATA to the FIFO queuing and scheduling block 122 along one path (e.g., PASS) or to the bit bucket 124 along another path (e.g., FAIL). The FIFO scheduling and queuing block 122 may present the signal DATA to the output 114 of the circuit 106. The bit bucket 124 may be implemented as a logical waste basket that is used to discard data packets within the signal DATA.

The FIFO scheduling and queuing block 122 generally comprises a FIFO buffer 126 and a queuing management circuit 128. The signal DATA may be read into the FIFO buffer 126 along the path PASS from the test circuit 120. The signal DATA may be read from the FIFO buffer 126 by the queuing management circuit 128 for presentation to the data output line 108.

The circuit 106 may be implemented as a single integrated circuit, as discrete components, software, firmware, microcode, or any combination thereof. Generally, the circuit 106 may be disposed in one or more positions between the sender 102 and the receiver 110. For example, the circuit 106 may be part of a network interface card embedded in the receiver 110. In another example, the circuit 106 may be part of a server firewall between one network reaching the sender 102 and another network reaching the receiver 110. In yet another example, the circuit 106 may be part of a router along the Internet.

Figure 2:
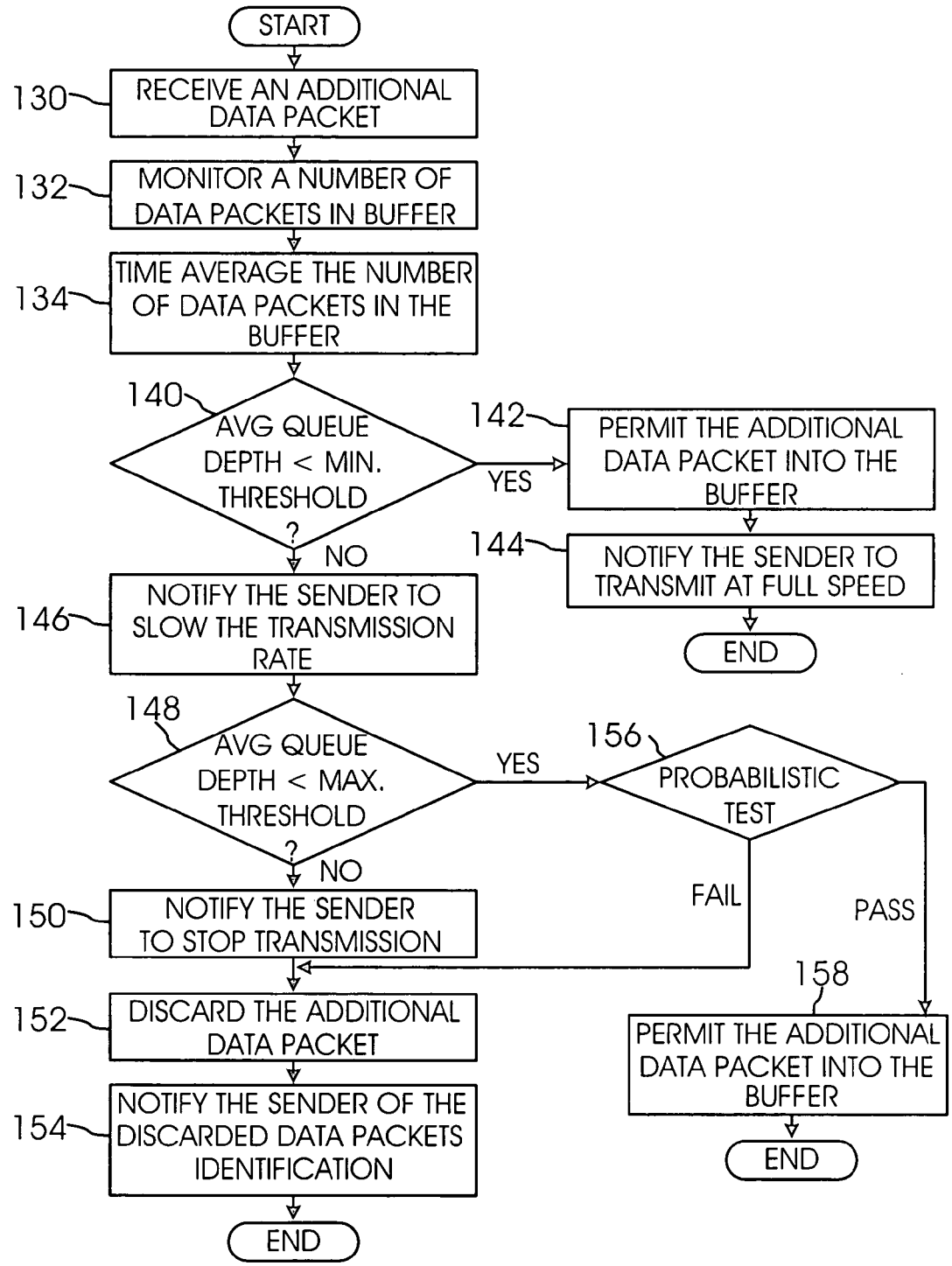
FIG. 2 is a flow diagram illustrating a probabilistic packet discard operation.
Figure 3:
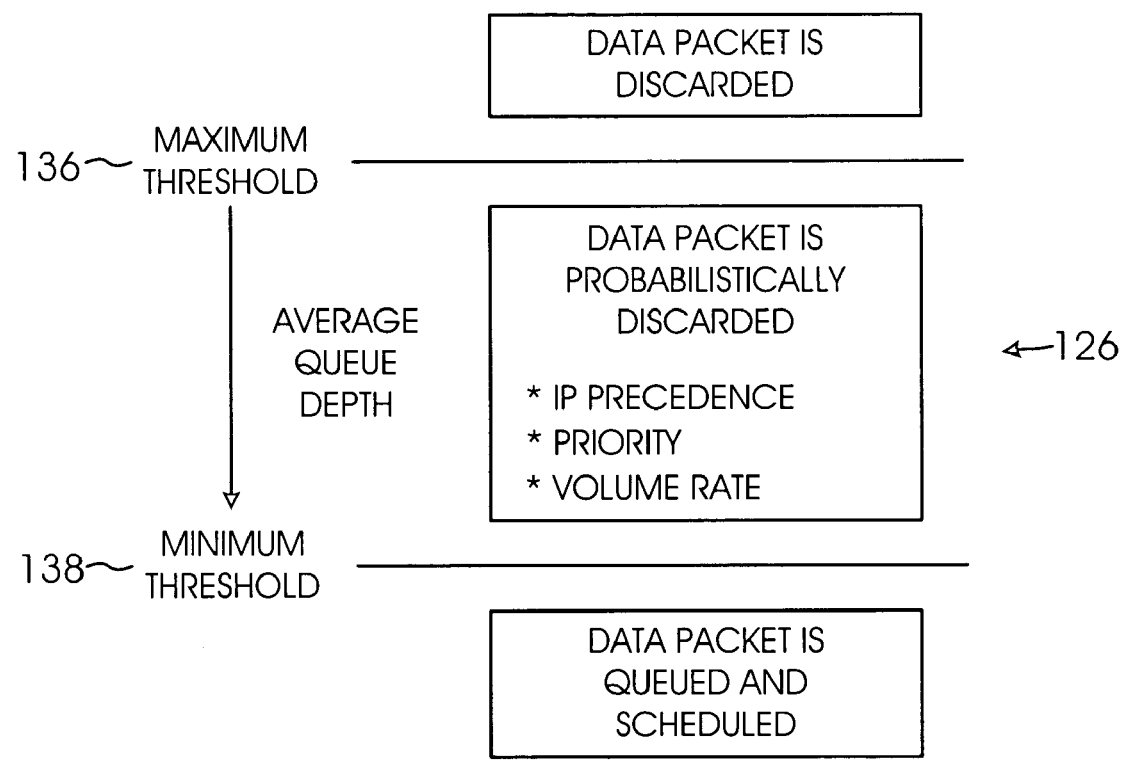
FIG. 3 is a diagram of a buffer showing thresholds.

Referring to FIG. 2, a flow diagram of the data packet congestion management technique is shown. Referring to FIG. 3, a diagram of an average queue depth in the FIFO buffer 126 is shown. The data packet congestion management technique may be implemented by the test circuit 120 in a preferred embodiment of the present invention. The data packet congestion management technique generally allows a specific TCP flow to slow the transmission rate of data packets to a given the FIFO buffer 126 in order to avoid congestion and lost data packets.

Upon receipt of an additional data packet from the sender 102 (e.g., block 130) the test circuit 120 may monitor a number of data packets in the FIFO buffer 126 (e.g., block 132). In a preferred embodiment, the number of data packets in the FIFO buffer 126 may be time averaged by the test circuit 120 to produce a signal (e.g., AVG_QUE block 134). The signal AVG_QUE may serve as an average queue depth or a time average number of data packets in the FIFO buffer 126. The signal AVG_QUE may vary from a maximum threshold 136 (FIG. 3) to below a minimum threshold 138 (FIG. 3). The maximum threshold may be determined by a design of the FIFO buffer 126. The maximum threshold is generally set near or at the capacity of the FIFO buffer 126. The minimum threshold may be established as a percentage of the maximum threshold, a percentage of the capacity of the FIFO buffer 126, a fixed amount, or the like.

The test circuit 120 may use the signal AVG_QUE to detect symptoms of congestion in the FIFO buffer 126 (e.g., decision block 140). If the signal AVG_QUE is below the minimum threshold (e.g., the YES branch of decision block 140), then the test circuit 120 generally permits the additional data packet into the FIFO buffer 126 for storage (e.g., block 142). After the additional data packet is stored in the FIFO buffer 126, the additional data packet is generally queued and scheduled for transmission to the receiver 110. The test circuit 120 may simultaneously present the signal RATE to the sender 102 in a fast condition (e.g., block 144). The fast condition generally notifies the sender 102 to transmit more data packets at a high or full rate.

Upon detection of symptoms of congestions occurring (e.g., the NO branch of decision block 140), the test circuit 120 may present the signal RATE in a slow condition (e.g., block 146). The slow condition generally informs the sender 102 to slow the rate of transmission. The test circuit 120 may compare the signal AVG_QUE against the maximum threshold (e.g., decision block 148). If the signal AVG_QUE is below the maximum threshold (e.g., the YES branch of decision block 148) then the test circuit 120 may or may not discard the additional data packet. If the signal AVG_QUE is at the maximum threshold (e.g., the NO branch of decision block 148) then the test circuit 120 may present the signal RATE in a stop condition (e.g., block 150). The stop condition generally notifies the sender 102 to stop transmission of any additional data packets because the FIFO buffer 126 is full.

Once the FIFO buffer 126 is full, the additional data packet just received is generally discarded (e.g., block 152). The test circuit 120 may present the signal ID to the sender 102 upon discarding of any data packet (e.g., block 154). The signal ID generally notifies the sender 102 which data packet has been discarded and thus should be resent.

If the signal AVG_QUE is between the minimum threshold and the maximum threshold (e.g., the YES branch of decision block 148) then the additional data packet just received may or may not be buffered. The test circuit 120 performs a probabilistic test on the additional data packet (e.g., decision block 156). If the probabilistic test fails (e.g., the FAIL branch of decision block 156), then the additional data packet is discarded. As before, the additional data packet may be discarded (e.g., block 152). The signal ID may then be presented to the sender 102 to identify the discarded data packet for purposes of retransmission. Once the congestion has been reduced, normal TCP flow generally can proceed and the discarded data packets may be resent. If the probabilistic test passes (e.g., the PASS branch of decision block 156), then the additional data packet is generally permitted into the FIFO buffer 126 (e.g., block 156) for storage.

The probabilistic test performed by the test circuit 120 may take one or more parameters into account when determining whether or not to queue/discard the additional data packet. The parameters may include, but are not limited to, an Internet Protocol (IP) precedence (e.g., high or low), a priority associated with the additional data packet, a data packet volume rate of flow into the circuit 106, a data packet volume rate of flow out of the circuit 106, a rate of change of the signal AVG_QUE, and/or the number of data packets in the FIFO buffer 126 as compared to the maximum threshold. For example, if a high number of high IP precedence data packets are being received by the circuit 106, then the probabilistic test may fail any data packets having the low IP precedence. However, if the rate of change of the signal AVG_QUE is constant or decreasing, the probabilistic test may pass the data packets having the low IP precedence. A number of different probabilistic tests may be employed within the present invention in to meet the design criteria of a particular application.

The signal RATE generally provides for at least the fast condition and the slow condition. The stop condition may be provided for in a preferred embodiment of the present invention. The slow condition may have one or more values, depending upon the capabilities of the sender 102. For example, if the sender 102 is capable of transmitting data packets at two different rates, then only one slow condition may be presented by the test circuit 120. If the sender 102 is capable of transmitting data packets at multiple rates, then the slow condition may be implemented to distinguish the various possible rates.

Generally, the present invention may provide congestion detection over networks by implementing a TCP flow throttling mechanism. The present invention may also provide data packet recovery. Consequently, the present invention may allow for Voice over Internet Protocol (VoIP), Telephony Systems, Virtual Private Networks (VPN), and any other high-resource, high-bandwidth, packet-based protocols to transmit data over network systems.

The various signals of the present invention are generally shown on individual inputs and outputs. In other embodiments, some or all of the various signals may be multiplexed through one or more inputs and/or outputs as desired or required. For example, the signal RATE and the signal ID may be contained in a signal acknowledgment data packet presented to the sender 102.

The function performed by the flow diagram of FIG. 2 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
a buffer for storing a plurality of data packets; and
a test circuit configured to: (i) monitor a number of said plurality of data packets in said buffer, (ii) receive an additional data packet to said plurality of data packets, (iii) store said additional data packet into said buffer responsive to said number being less than a first threshold, (iv) discard said additional data packet in accordance with a probabilistic test responsive to said number being greater than said first threshold, and (v) presenting an identification signal to a sender of said additional data packet, indicating that said additional data packet was discarded and can be resent.

2. The circuit according to claim 1, wherein said test circuit is further configured to always discard said additional data packet without storing said additional data packets in said buffer in response to said number being at least as great as a second threshold.

3. The circuit according to claim 2, wherein said test circuit is further configured to present a rate signal to a sender of said additional data packets in a stop transmission condition in response to said number being greater than said second threshold.

4. The circuit according to claim 1, wherein said test circuit is further configured to present a rate signal to said sender in a slow rate condition in response to said number being greater than said first threshold.

5. The circuit according to claim 4, wherein said test circuit is further configured to present said rate signal to said sender in a full rate condition in response to said number being less than said first threshold.

6. The circuit according to claim 1, wherein said probabilistic test is based upon a precedence.

7. The circuit according to claim 1, wherein said probabilistic test is based upon a priority.

8. The circuit according to claim 1, wherein said probabilistic test is based upon a volume rate.

9. The circuit according to claim 1, wherein said number is a time average of said data packets in said buffer.

10. The circuit according to claim, 9, wherein said test circuit is further configured to (i) discard said additional data packet in response to said number being at least as great as a second threshold, (ii) present a rate signal in a first condition in response to said number being greater than said first threshold, and (iii) present said rate signal in a second condition in response to said number being less than said first threshold.

11. The circuit according to claim 9, wherein said number is determined before said additional data packet is permitted into said buffer.

12. The circuit according to claim 1, further comprising a queuing management circuit disposed between said buffer and an output and configured to transfer said data from said buffer to said output.

13. A method for managing congestion of a plurality of data packets in a buffer of a circuit, comprising the steps of:
(A) monitoring a number of said plurality of packets in said buffer;
(B) receiving an additional data packet to said plurality of data packets;
(C) storing said additional data packet into said buffer in response to said number being less than a first threshold;
(D) discarding said additional data packet in accordance with a probabilistic test without said additional data packets reaching said buffer in response to said number being greater than said first threshold; and
(E) presenting an identification signal from said circuit to a sender of said additional data packet, said identification signal indicating that said additional data packet was discarded and can be resent.

14. The method according to claim 13, further comprising the step of: always discarding said additional data packet in response to said number being at least as great as a second threshold.

15. The method according to claim 14, further comprising the step of: presenting a rate signal to a sender of said additional data packets in a stop transmission condition in response to said number being greater than said second threshold.

16. The method according to claim 13, further comprising the step of: presenting a rate signal to said sender in a slow rate condition in response to said number being greater than said first threshold.

17. The method according to claim 16, further comprising the step of: presenting said rate signal to said sender in a full rate condition in response to said number being less than said first threshold.

18. The method according to claim 13, further comprising the step of: time averaging said number prior to step (C).

19. A circuit comprising:
means for monitoring a number of a plurality packets in a buffer;
means for receiving an additional data packet plurality of data packets;
means for storing said additional data packet into said buffer in response to said number being less than a first threshold;
means for discarding said additional data packet without storing said additional data packets in said buffer in accordance with a probabilistic test in response to said number being greater than said first threshold; and
means for presenting an identification signal from said circuit to a sender of said additional data packet, said identification signal indicating that said additional data packet was discarded and can be resent.

20. The circuit according to claim 19, further comprising means for managing presentation of said data packets from said buffer to an output.

* * * * *